United States Patent [19]
Yoshiyasu

[11] 3,989,222
[45] Nov. 2, 1976

[54] SOLENOID VALVE

[76] Inventor: Fumiya Yoshiyasu, 4-51 Nishiuchie-cho,, Nishi, Nagoya, Aichi, Japan

[22] Filed: July 28, 1975

[21] Appl. No.: 599,923

[52] U.S. Cl. .................................. 251/30; 251/38; 251/130
[51] Int. Cl.² ........................................ F16K 31/06
[58] Field of Search ...................... 251/38, 30, 130

[56] References Cited
UNITED STATES PATENTS

| | | | |
|---|---|---|---|
| 1,793,252 | 2/1931 | Roth ................................. | 251/38 X |
| 2,111,230 | 3/1938 | Toussaint .......................... | 251/38 X |
| 2,652,855 | 9/1953 | Wright ............................. | 251/130 X |
| 2,687,869 | 8/1954 | Kanuch ............................ | 251/38 X |
| 2,695,154 | 11/1954 | Dillman ........................... | 251/130 X |
| 3,114,532 | 12/1963 | Gray et al. ........................ | 251/30 |
| 3,421,546 | 1/1969 | Jennings et al. ................. | 251/130 X |

*Primary Examiner*—Arnold Rosenthal
*Attorney, Agent, or Firm*—George B. Oujevolk

[57] ABSTRACT

A power operated valve comprises a valve body having an inlet chamber and an outlet chamber, a movable valve element for selectively controlling a passage of fluid from the inlet chamber to the outlet chamber and an actuator rod for moving the valve element. A solenoid structure is removably mounted on the valve body for reciprocating the rod having a plunger positioned on the same axis as of the rod to be detachably connected with it. A manually operated knob is removably mounted on the solenoid structure for reciprocating the rod having a knob shaft positioned on the same axis as of the plunger to be detachably connected with it.

5 Claims, 9 Drawing Figures

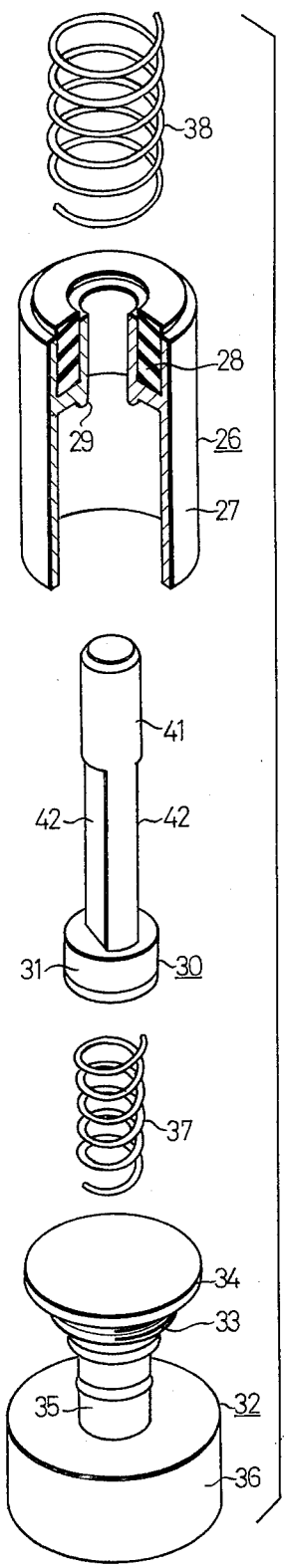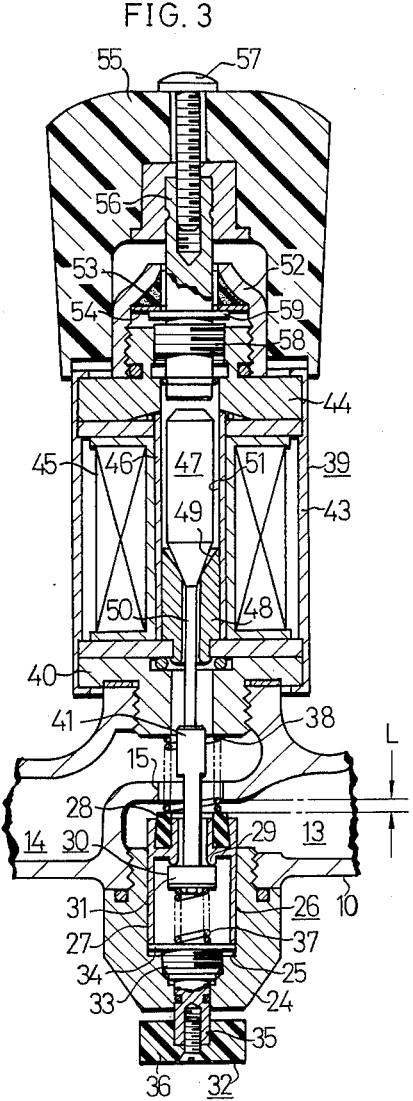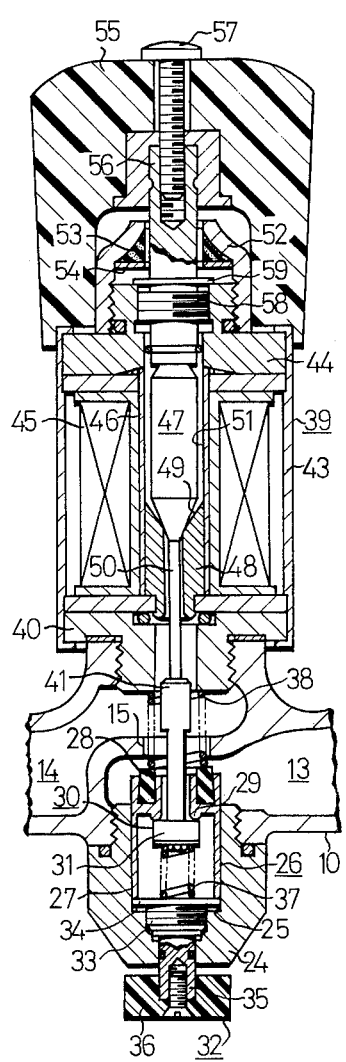

SOLENOID VALVE

This invention relates to a power operated valve adapted to control the flow of fluid such as water of the waterworks, and particularly to a solenoid operated faucet of this type.

In solenoid valves popularly used in households, a solenoid structure is fastened to a valve body having a movable valve element, and when the solenoid structure is powered, said valve element is moved to open a passage of fluid or water from the inlet chamber to the outlet chamber in said valve body, so that water in a water pipe is spouted through the valve body. In a solenoid valve of this type, however, since it is impossible to open and close the valve element manually, at the time of a power failure or when the solenoid structure gets out of order, the solenoid cannot be used. As means for overcoming this disadvantage, a manually operated faucet is disposed in a pipe connected in parallel to this solenoid operated valve or faucet, so that it is used and operated at the time of a power failure or when the solenoid structure of the solenoid faucet gets out of order. This structure is complicated and expensive, and is defective in that the attachment cost is high. Further, in a solenoid valve of the above-mentioned type, since the valve element in the valve body is quickly moved from the opened position to the closed position, water hammering is caused in a water pipe of the waterworks and there is a danger that the water pipe is broken under a shock of the water hammering.

It is therefore a primary object of this invention to provide a power operated valve which has a simple structure and can be repaired very easily and which can be opened and closed manually at the time of a power failure or when a solenoid structure gets out of order.

Another object of the invention is to provide a power operated valve in which an excessive operation of a manually operated knob is inhibited at the manual operation and troubles of related members can be prevented, and in which at the time of the solenoid operation, heating of a solenoid structure is inhibited to prevent troubles of related members and damages of a cord for powering the solenoid structure are prevented to reduce a risk of an electric leakage.

A further object of the invention is to provide a power operated valve in which a valve element in a valve body is slowly moved so that occurrence of water hammering is prevented in a water pipe of the waterworks.

A still further object of the invention is to provide a power operated valve in which a desired quantity of spouted water can be obtained by controlling the movement quantity of a valve element in a valve body.

Other and further objects of the present invention will become apparent from the following specification and claims, taken together with the accompanying drawings, in which:

FIG. 2 is an enlarged perspective view illustrating main and subsidiary valves dismounted and taken out of the valve body;

FIGS. 3 and 4 are longitudinally sectional partial views of solenoid valves illustrating the state where valve elements are moved into the opened position by a solenoid structure and a manually operated knob;

Figure 1:
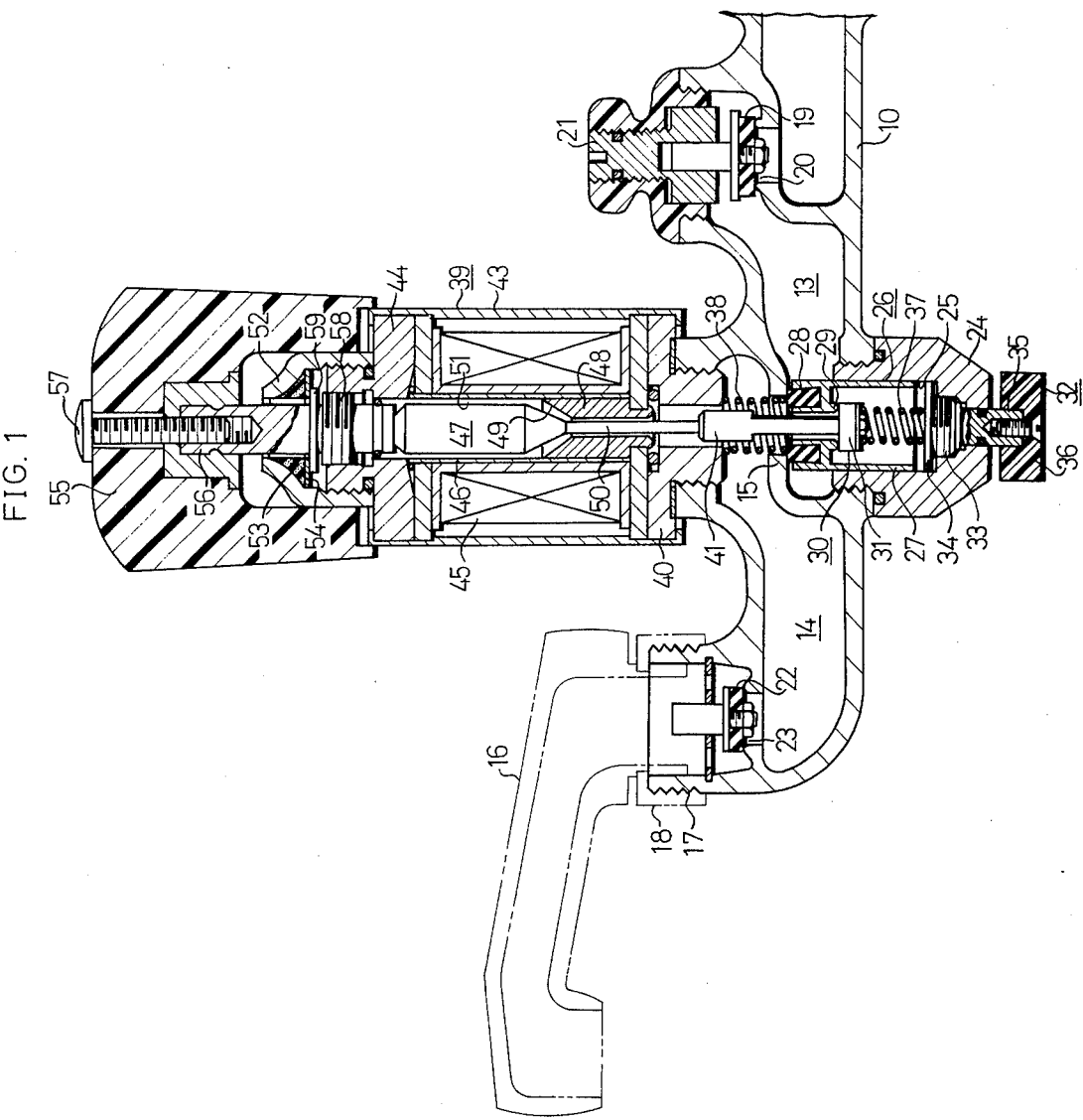
FIG. 1 is a longitudinally sectional view of a solenoid valve embodying the present invention.
Figure 7:
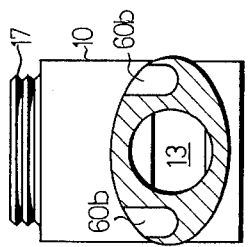
FIG. 7 is a view showing the section of the valve body taken along the line 7—7 in FIG. 5.
Figure 8:
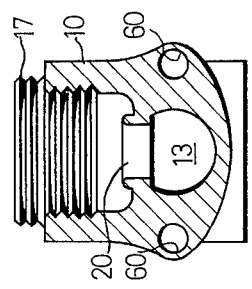
FIG. 8 is a view showing the section of the valve body taken along the line 8—8 in FIG. 5.
Figure 5:
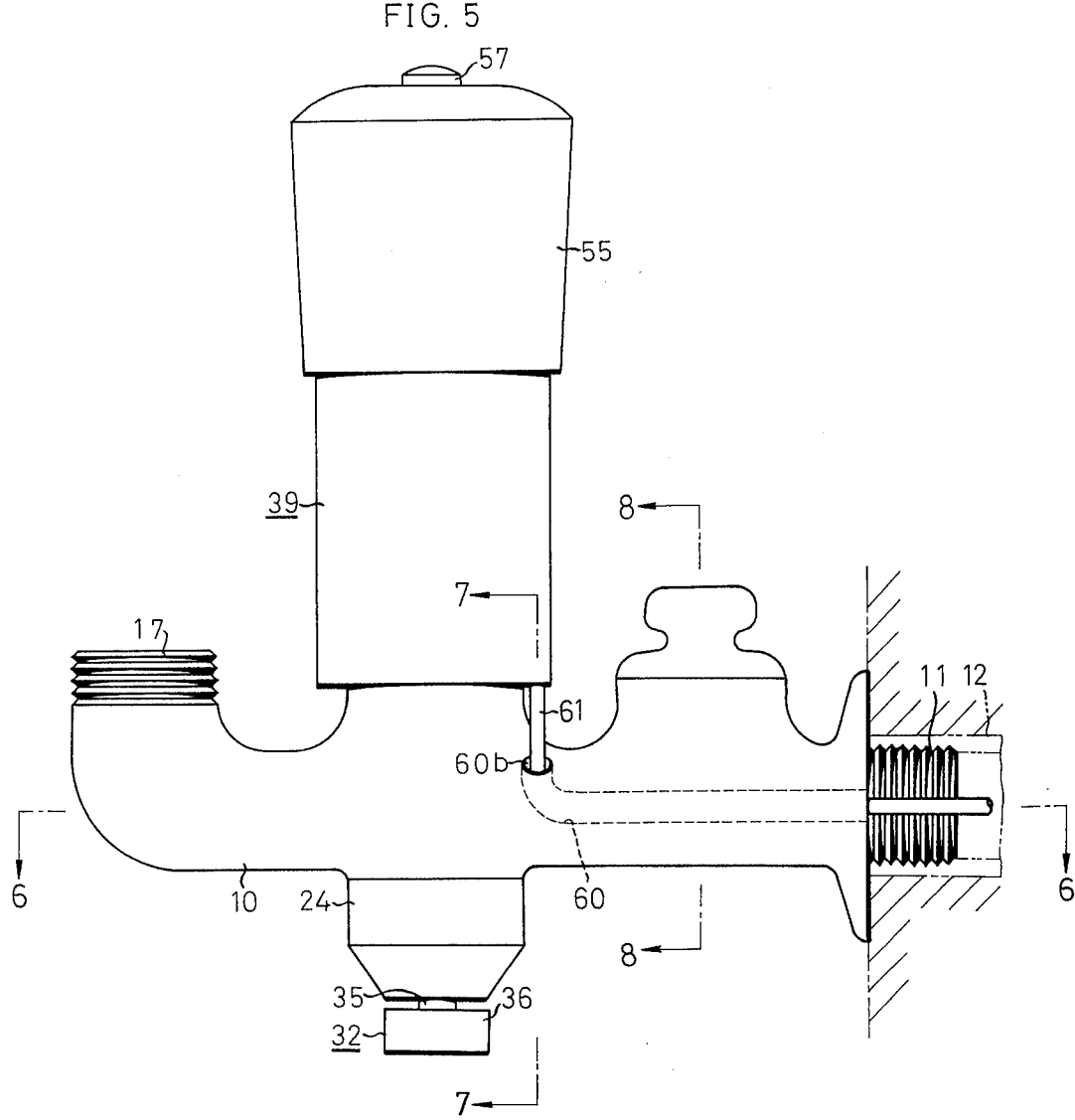
FIG. 5 is a side view of the solenoid valve shown in FIG. 1.
Figure 6:
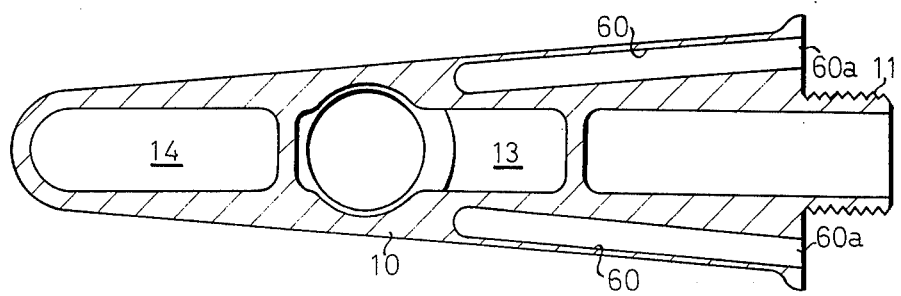
FIG. 6 is a view showing the section of the valve body taken along the line 6—6 in FIG. 5.

Referring now to the accompanying drawings, particularly to FIGS. 1 and 5, a valve body 10 is threadedly connected at a screw thread 11 to the end portion of a water pipe 12 of the waterworks having an inlet chamber 13 and an outlet chamber 14 with a fixed main valve seat 15 therebetween. A spout pipe 16 is removably connected to a screw thread 17 formed at the side end portion of the outlet chamber 14 of the valve body 10 through a coupling member 18. A subsidiary valve 19 is movably mounted on a valve seat 20 in said inlet chamber 13, and the valve 19 is moved by a rotational operation of an adjust screw 21 threaded to the valve body 10 so as to control the flow of water in the inlet chamber 13. A check valve 22 is movably mounted on a valve seat 23 in said outlet chamber 14 to prevent a backward flow of water in the outlet chamber 14.

As is illustrated in FIGS. 1 and 2, below the main valve seat 15, a bottomed cylinder member 24 having a cylinder chamber 25 opened to the interior of the inlet chamber 13 is threaded to the valve body 10. A main valve assembly 26 movably disposed below the main valve seat 15 includes a piston portion 27 adapted to be inserted into the cylinder chamber 25 and a resilient valve element 28 secured on the piston portion 27 so that it is engaged with the valve seat 15. By a downward or upward operation of the main valve assembly 26, the passage of water from the inlet chamber 13 to the outlet chamber 14 is opened or closed. A subsidiary valve assembly 30 is movably disposed below a subsidiary valve seat 29 and has a resilient valve element 31 to be engaged with the subsidiary valve seat 29, and by a downward or upward operation of this subsidiary valve assembly 30, the passage of water from the cylinder chamber 25 to the outlet chamber 14 is opened or closed.

In an adjust screw portion 33, an adjust assembly 32 is attached to the bottom of the cylinder member 24 so that it can make vertical and rotational movements, and this adjust assembly 32 includes a limit flange 34 secured on the adjust screw portion 33 to be engaged with the lower end of the piston portion 27 of the main valve assembly 26 in the cylinder chamber 25, a shaft 35 extending from the screw portion 33 to below the cylinder member 24, and a manually adjusted knob 36 secured to the lower end of the shaft 35. When the limit flange 34 in the cylinder chamber 25 is set at a desired position by the knob 36, the movement of the main valve assembly 26 is limited within a desired movement quantity range, and the quantity of water fed from the inlet chamber 13 to the outlet chamber 14 is set in accordance with the movement quantity of the main valve assembly 26.

A coil spring 37 engages the lower surface of the subsidiary valve assembly 30 and the upper surface of the limit flange 34 to urge the main and subsidiary valve assemblies 26 and 30 to the normally closed positions as illustrated in FIG. 1. An enervated coil spring 38 engages the upper surface of the main valve assembly 26 and the lower surface of a base member 40 of a solenoid assembly to urge the main valve assembly 26 toward the opened position as illustrated in FIGS. 3 and 4. The main valve assembly 26 can be moved slowly from the opened position to the closed position without causing water hammering in the water pipe 12 of the waterworks by co-operation of said enervated coil spring 38, cylinder member 24 and piston portion 27. As is illustrated in FIGS. 1 and 2, an actuator rod or stem 41 secured at the lower end thereof to the subsidiary valve assembly 30 extends upwardly through the upper portion of the main valve assembly 26, and notches 42 are formed on the outer periphery of the rod or stem 41 to facilitate communication of the cylinder chamber 25 and the outlet chamber 14.

As is illustrated in FIG. 1, in the base member 40, the solenoid assembly 39 removably mounted threadedly on the valve body 10 includes a casing 43 having a lid member 44, an electro-magnet coil 45 surrounding a thin wall tube 46, and a plunger 47 made of a magnetic material and contained in the thin wall tube 46 so that it is operated by the coil structure 45. A stop member 48 is fixedly contained in the interior of the lower end portion of the thin wall tube 46, and it has at the upper end thereof a tapering stop surface 49 to be engaged with the lower end face of the plunger 47 to limit the downward operation of the plunger 47. A connecting rod 50 is extended downwardly from the lower end of the plunger 47 through the stop member 48 so that the rod 50 is positioned on the same axis as that of the actuator rod 41, and the connecting rod 50 is detachably connected to the upper end of the actuator rod 41 in the base member 40 to reciprocate the actuator rod 41. A plunger chamber 51 is disposed in the thin wall tube 46 surrounding the plunger 47 and is communicated with the outlet chamber 14 through the base member 40 and the stop member 48 so that water in the outlet chamber 14 of the valve body 10 is flown into the plunger chamber 51, whereby the solenoid structure is cooled by water in the plunger chamber 51 when it is urged.

As is illustrated in FIG. 1, a cap member 52 is removably mounted threadedly on the outer periphery of the upper end portion of the lid member 44 has on the inner face of the top portion thereof a resilient cushion member 53 and a stop washer 54. In order reciprocate the actuator rod 41 manually without using the solenoid assembly 39, a manually operated knob 55 is rotatably mounted on the outer periphery of the cap member 52 on the top face of the solenoid assembly 39. A knob shaft 56 having the upper end secured to the knob 55 by a bolt 57 extends downwardly through the cap member 52 so that the knob 56 is positioned on the same axis as of the plunger 47. A screw thread portion 58 connected threadedly to the inner periphery of the upper end of the lid member 44 of the solenoid assembly 39 is disposed on the outer periphery of the lower end of the knob shaft 56. This knob shaft 56 is detachably connected to the upper end of the plunger 47 in the lid member 44 to reciprocate the actuator rod 41 through the plunger 47. A stop flange 59 disposed on the outer periphery of the knob shaft 56 above the screw thread portion 58 becomes engaged with the upper surface of the lid member 44 or the lower surface of the stop washer 54 with vertical reciprocation of the knob shaft 56, so as to limit the operation of the manually operated knob 55 within a range of a fixed quantity and prevent troubles of related members by an excessive operation of the knob 55.

Figure 9:
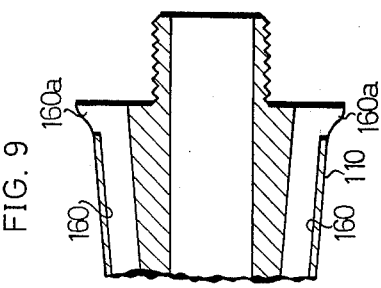
FIG. 9 is a sectional partial view of the valve body showing another embodiment of the hole structure for insertion of cords.

As is shown in FIGS. 5 to 8, a pair of holes 60 are formed in both the side portions of the valve body 10 substantially in parallel to the outlet chamber 14, so that one end 60a is opened at the base portion of the valve body 10 and the other end 60b is opened on the outer peripheral face of the valve body 10 at a point adjacent to the solenoid assembly 39. A cord 61 for powering the solenoid assembly 39 extends from the wall face to which the solenoid valve is attached, and is inserted into the other end 60b from the one end 60a through the hole 60 and is connected to a coil structure 45 of the solenoid assembly 39. The other hole 60 is used for containing therein a cord for powering an indicator lamp (not shown) in the solenoid valve of the type where the indicator lamp disposed in the manually operated knob 55 is enlightened when the solenoid assembly 39 is powered. As is seen from the foregoing illustration, the cord 61 is contained without a risk of being damaged and electric leakage can be prevented effectively. In another embodiment of the valve body 110 shown in FIG. 9, in a pair of holes 160, one end 160a is opened in the peripheral direction at the base portion of the valve body 110. Accordingly, the cord contained in the hole 160 can be extended outwardly along the attached wall face from the one end 160a of the hole 160.

In the operation of the above described solenoid valve, the quantity of water to be spouted can easily be varied by adjusting the movement quantity of the main valve assembly 26 indicated by reference L in FIG. 3 by means of the adjust assembly 32. More specifically, when the limit flange 34 is moved downwardly by the manually adjusted knob 36 so as to increase the movement quantity of the main valve assembly 26, the quantity of water spouted from the spout pipe 16 is increased. On the other hand, when the limit flange 34 is moved upwardly so as to decrease the movement quantity of the valve assembly 26, the quantity of water spouted is reduced. In the normal state, the valve assemblies 26 and 30 are moved by the solenoid assembly 39. More specifically, in the stationary state of the solenoid valve shown in FIG. 1, when the coil structure 45 of the solenoid assembly 39 is powered, the plunger 47 is moved downwardly to urge the actuator rod 41 downwardly. At this point, the subsidiary valve assembly 30 is moved downwardly against an elastic force of the coil spring 37 to detach from the subsidiary valve seat 29, and the cylinder chamber 25 in the cylinder member 24 is communicated with the outlet chamber 14 through the passageway in the valve seats 29 and 15. Accordingly, water in the cylinder chamber 25 is flown into the outlet chamber 14 to reduce the hydraulic pressure in the cylinder chamber 25.

Then, as is illustrated in FIG. 3, the main valve assembly 26 is moved downwardly by co-operation of the difference of the hydraulic pressure between the inlet chamber 13 and the cylinder chamber 25 and the elastic action of the enervated coil spring 38, until the lower end of the piston portion 27 falls in engagement with the top face of the limit flange 34 of the adjust assembly 32. Accordingly, the inlet chamber 13 is communicated with the outlet chamber 14 through the passageway in the valve seat 15, and a desired quantity of water is flown to the spout pipe 16 from the water pipe 12 of the waterworks through the inlet chamber 13 and the outlet chamber 14 and spouted from the top end of the spout pipe 16. At this point, because of the presence of a fine clearance between the lower end of the plunger 47 and the tapering stop surface 49 of the stop member 48, the plunger chamber 51 in the solenoid assembly 39 is communicated with the outlet chamber 14 through the stop member 48 and the base member 40, and water is flown into the plunger chamber 51 from the outlet chamber 14. Thus, the solenoid assembly 39 is cooled by water in the plunger chamber 51, and burning loss of the coil structure 45 in the powered state is prevented.

When the coil structure 45 is de-energized, the plunger 47, actuator rod 41, main valve assembly 26 and subsidiary valve assembly 30 are moved upwardly by the elastic action of the coil spring 37 from the operation positions shown in FIG. 3 to the stationary positions shown in FIG. 1. At this point, water in the inlet chamber 13 passes through a fine clearance between the inner peripheral face of the cylinder member 24 and the outer peripheral face of the piston portion 27, and is gradually flown into the cylinder chamber 25. Further, the main valve assembly 26 is downwardly urged by the enervated coil spring 38. By co-operation of the foregoing members, the main valve assembly 26 is slowly moved upwardly. Accordingly, the passageway between the inlet chamber 13 and the outlet chamber 14 is gradually closed without causing water hammering in the water pipe 12, and spouting of water is thus ceased.

In case the solenoid assembly 39 cannot be used because of a power failure or other trouble of the solenoid assembly 39, the valve assemblies 26 and 30 are moved by the manually operated knob 55. More specifically, in the stationary state shown in FIG. 1, when the knob 55 is rotated to move the knob shaft 56 downwardly, the subsidiary valve assembly 30 is moved downwardly through the plunger 47 and the actuator rod 41, whereby, as in the above-mentioned case, the main valve assembly 26 is moved downwardly to detach from the valve seat 15, and as is illustrated in FIG. 4, the passageway between the inlet chamber 13 and the outlet chamber 14 is opened and water is spouted from the top end of the spout pipe 16. In the state shown in FIG. 4, when the knob 55 is rotated in a direction reverse to the above to move the knob shaft 56 upwardly, the plunger 47, actuator rod 41, main valve assembly 26 and subsidiary valve assembly 30 are slowly moved upwardly from the operation positions shown in FIG. 4 to the stationary positions shown in FIG. 1 as in the above-mentioned case where the solenoid assembly 39 is de-energized. Accordingly, the passageway between the inlet chamber 13 and the outlet chamber 14 is closed to stop spouting of water. At this operation, if the knob shaft 56 is moved downwardly by the knob 55, the stop flange 59 on the outer periphery of the knob shaft 56 is engaged with the upper surface of the lid member 44, and when the knob shaft 56 is moved upwardly, the stop flange 59 is engaged with the lower surface of the stop washer 54, whereby the reciprocation of the knob shaft 56 is limited within a fixed quantity range and the knob 55 is prevented from performing an excessive operation.

In case the interior of the manually operated knob 55 or solenoid assembly 39 is repaired in the state where the valve body 10 is attached to the water pipe as shown in FIG. 5, if only the bolt 57 is loosened, the knob 55 can easily be dismounted from the knob shaft 56 and if the cap member 52 is loosened from the lid member 44 of the solenoid assembly 39, the knob shaft 56 is detached from the plunger 47 in the solenoid assembly 39. If the thread portion of the base member 40 is loosened, the solenoid assembly 39 can easily be dismounted from the valve body 10, and the connecting rod 50 on the plunger 47 is separated from the actuator rod 41 in the valve body 10. At this point, the main valve assembly 26 and subsidiary valve assembly 30 are kept in the state closing the passageways in the valve seats 15 and 29 by the elastic action of the coil spring 37, whereby water in the inlet chamber 13 is prevented from leakage.

From the foregoing illustration, it is apparent that the present invention provides a power operated valve which has a simple structure with reduced troubles and can be operated with ease and safety, and which can be used conveniently by a manual operation even at the time of a power failure or when a trouble is caused in the solenoid structure.

While the described embodiment represents the preferred form of the present invention, it is to be understood that modifications will occur to those skilled in the art without departing from the spirit of the invention. The scope of the invention is therefore to be determined solely by the appended claims.

I claim as my invention:

1. A power operated valve comprising:
    a. a valve body (10) having an inlet chamber (13) and an outlet chamber (14) with a main valve seat (15) therebetween, said main valve seat (15) having a passageway therein;
    b. a cylinder member (24) removably mounted on the lower surface of the valve body having a cylinder chamber (25) opened to the interior of the inlet chamber;
    c. a main valve element (26) movably positioned in the cylinder chamber for selectively communicating the inlet chamber (13) with the outlet chamber (14) through said passageway in the main valve seat (15), a subsidiary valve seat (29) positioned on the same axis as of the main valve seat, said subsidiary valve seat having a passageway therein;
    d. a limit member (34) adjustably disposed in the cylinder chamber for limiting the movement of the main valve element within a desired movement quantity range;
    e. a subsidiary valve element (30) movably disposed below the subsidiary valve seat (29) for selectively communicating the cylinder chamber with the outlet chamber through said passageway in the subsidiary valve seat;
    f. spring means (37) disposed between the subsidiary valve element and the limit member (34) to urge the main and subsidiary valve elements to normally closed positions;
    g. an actuator rod (41) extending from the subsidiary valve element (30) through the passageways to move the subsidiary valve element to the opened position;
    h. a solenoid structure (39) removably mounted on the upper surface of the valve body for reciprocating the actuator rod having a plunger (47) positioned on the same axis as of the actuator rod (41) to be detachably connected with it; and,
    i. a manually operated knob (55) removably mounted on the solenoid structure (39) for reciprocating the actuator rod (41) having a knob shaft positioned on the same axis as of the plunger (47) to be detachably connected with it, said main valve element having a piston portion adapted to be inserted in the cylinder chamber, whereby the main valve element is slowly moved from the opened position to the closed position.

2. A power operated valve as claimed in claim 1 which further comprises means for limiting the operation of said knob within a fixed quantity range, whereby the knob is prevented from an excessive operation.

3. A power operated valve as claimed in claim 1 wherein said valve body has a hole for passaging a cord from the end portion of the valve body to said solenoid structure.

4. A power operated valve as claimed in claim 1 which further comprises means for communicating an outlet chamber in said valve body with a plunger chamber in said solenoid structure, whereby the solenoid structure is cooled by fluid in said plunger chamber.

5. A power operated valve as claimed in claim 1 which further comprises means for urging said main valve element toward the opened position, whereby the main valve element is more slowly moved from the opened position to the closed position.

* * * * *